United States Patent
Sham et al.

(10) Patent No.: US 9,714,833 B2
(45) Date of Patent: Jul. 25, 2017

(54) METHOD OF DETERMINING THE LOCATION OF A POINT OF INTEREST AND THE SYSTEM THEREOF

(71) Applicant: Insight Robotics Limited, Hong Kong (CN)

(72) Inventors: Pui Sum Rex Sham, Hong Kong (CN); Chik Man So, Hong Kong (CN)

(73) Assignee: Insight Robotics Limited, Hong Kong (CN)

( * ) Notice: Subject to any disclaimer, the term of this patent is extended or adjusted under 35 U.S.C. 154(b) by 0 days.

(21) Appl. No.: 14/913,378

(22) PCT Filed: Aug. 23, 2013

(86) PCT No.: PCT/IB2013/056837
§ 371 (c)(1),
(2) Date: Feb. 22, 2016

(87) PCT Pub. No.: WO2015/025195
PCT Pub. Date: Feb. 26, 2015

(65) Prior Publication Data
US 2016/0202071 A1    Jul. 14, 2016

(51) Int. Cl.
*G01C 21/26* (2006.01)
*G01C 11/02* (2006.01)
*G01S 19/42* (2010.01)
*H04N 5/225* (2006.01)

(52) U.S. Cl.
CPC .............. *G01C 21/26* (2013.01); *G01C 11/02* (2013.01); *G01S 19/42* (2013.01); *H04N 5/225* (2013.01)

(58) Field of Classification Search
CPC .................................. G60K 9/36; G06F 17/00
See application file for complete search history.

(56) References Cited

U.S. PATENT DOCUMENTS 5,784,282 A * 7/1998 Abitbol .................. B25J 9/1692
                                                          700/186
7,728,869 B2 * 6/2010 Jung .................. G01C 21/3647
                                                          348/113

(Continued)

FOREIGN PATENT DOCUMENTS

| CN | 1880918 | 12/2006 |
| CN | 102884815 | 1/2013 |
| WO | 2009152567 | 12/2009 |

*Primary Examiner* — Thomas Tarcza
*Assistant Examiner* — Alex C Dunn
(74) *Attorney, Agent, or Firm* — Eagle IP Limited; Jacqueline C. Lui (57) ABSTRACT

A method of determining the location of a point of interest is disclosed. The method comprises the steps of providing an optical detector; capturing an image by the optical detector; obtaining the position and orientation of the optical detector; identifying at least one coordinates of the point of interest within the captured image; mapping the position of the optical detector and the coordinates of the point of interest in a digital elevation model; and determining the location of the point of interest by projecting at least one path from the position of the optical detector through the coordinates of the point of interest in the digital elevation model. A system for determining the location of a point of interest by utilizing the aforesaid method is also disclosed herein.

17 Claims, 4 Drawing Sheets

(56) References Cited

U.S. PATENT DOCUMENTS

| | | | | |
|---|---|---|---|---|
| 8,024,144 B2* | 9/2011 | Kludas | ................... | G01C 15/00 382/100 |
| 2007/0005609 A1* | 1/2007 | Breed | ................. | B60N 2/2863 |
| 2007/0021915 A1* | 1/2007 | Breed | ................. | B60N 2/2863 701/301 |
| 2007/0109111 A1* | 5/2007 | Breed | ................. | B60N 2/2863 340/435 |
| 2007/0152804 A1* | 7/2007 | Breed | ................. | B60N 2/2863 340/435 |
| 2009/0281765 A1* | 11/2009 | Deliwala | ................ | A63F 13/06 702/150 |
| 2010/0054627 A1* | 3/2010 | Rosenberg | ........... | G06T 3/4038 382/284 |
| 2011/0102580 A1* | 5/2011 | Langdon | ............... | G06T 7/0044 348/135 |
| 2011/0137561 A1* | 6/2011 | Kankainen | ........... | G01S 5/0247 701/300 |
| 2012/0215410 A1* | 8/2012 | McClure | .............. | A01B 79/005 701/50 |
| 2013/0060464 A1* | 3/2013 | Persson | ................. | G01C 21/20 701/445 |

* cited by examiner

METHOD OF DETERMINING THE LOCATION OF A POINT OF INTEREST AND THE SYSTEM THEREOF

FIELD OF INVENTION

This invention relates to a method of determining the location of a point of interest and the system thereof, and in particular a method and system of determining point of interest utilizing a single optical detector only.

BACKGROUND OF INVENTION

The automatic/intelligent monitoring systems nowadays can only detect the occurrence of a particular event but cannot specifically identify the location of the event. One of the possible solutions to this technical problem is to pre-input the geographic information of the monitoring area and corresponding monitoring devices manually. However, this kind of system cannot provide an accurate location of a particular point of interest or object of interest.

An alternative solution is to utilize multiple cameras to identify the location of the event. The resolution of this kind of system depends on the separation of the cameras. As such, a bulky system is required in order to provide accurate location information, especially in the case when the location of event is far away from the system. Another limitation of such system is that regular maintenance is required as the mechanical errors will accumulate over time.

SUMMARY OF INVENTION

In the light of the foregoing background, it is an object of the present invention to provide an alternate method of identifying the location of the event and a system thereof.

Accordingly, the present invention, in one aspect, is a method of determining the location of a point of interest. The method comprises the steps of providing an optical detector; capturing an image by the optical detector; obtaining the position and the orientation of the optical detector; identifying at least one coordinates of the point of interest within the captured image; mapping the position of the optical detector and the coordinates of the point of interest in a digital elevation model; and determining the location of the point of interest by projecting at least one path from the position of the optical detector through the coordinates of the point of interest in the digital elevation model.

In an exemplary embodiment of the present invention, the step of determining the location of the point of interest further comprises iterative steps of: extending the path in the direction away from the optical detector; and determining whether the path collides with any surface of said digital elevation model. The iterative steps terminate when (a) a collision surface is identified between the path and said digital elevation model or (b) said path has extended over a predetermined value. In one embodiment, the predetermined value is the range of the optical detector.

In another embodiment, the method further comprises a step of continuously rotating and tilting the optical detector within a predetermined angle while capturing the image.

In another embodiment, the method further comprises a step of generating the digital elevation model (DEM). The DEM is generated by first providing a point cloud comprising a plurality of points. Afterwards, the plurality of points are linked together thereby generating a three dimensional model of a terrain's surface. In one embodiment, each of the points correlates to the altitude of the terrain's surface at a specific latitude and longitude.

According to another aspect of the present invention, a system for determining the location of a point of interest is provided. The system comprises an optical detector for capturing an image comprising the point of interest; a movable platform coupled to the optical detector and configured to rotate and tilt the optical detector; a microprocessor coupled to the optical detector and the movable platform; and a non-transitory computer-readable storage medium coupled to the microprocessor. In one embodiment, the non-transitory computer-readable storage medium is encoded with computer-readable instructions for causing said microprocessor to execute the aforesaid method.

In one embodiment of the present invention, the optical detector is an infrared image sensor configured to capture the heat distribution.

In another embodiment, the system further comprises a mist-fog-penetrating detector. The mist-fog-penetrating detector comprises a high dynamic range image sensor; and a first light filter unit, which is configured to filter out visible spectrum, coupled to the high dynamic range image sensor.

In another embodiment, the system further comprises a sensing device coupled to the microprocessor and configured to detect the position and orientation of the optical detector and to feedback the position and orientation to the microprocessor. In one embodiment, the sensing device comprises a Global Positioning System receiver and an attitude and heading reference system (AHRS) configured to detect position and orientation of the optical detector respectively.

In a further aspect of the present invention, a non-transitory computer readable storage medium encoded with instructions which causes performance of steps of: capturing an image by an optical detector; obtaining the position and orientation of the optical detector; identifying at least one coordinates of the point of interest within the image; mapping the position of the optical detector and the coordinates of the point of interest in a digital elevation model; and determining the location of the point of interest by projecting at least one path from the position of the optical detector through the coordinates of the point of interest in the digital elevation model is provided.

There are many advantages to the present invention. Comparing with existing monitoring system, the present invention utilizes only one optical detector. As such, the present invention has a smaller form factor and is more cost effective when comparing with other existing system. Another advantage of the present invention is that the mechanical error of the movable platform will not affect the detection accuracy as (1) the detection algorithm is conducted using the DEM and (2) the system comprises a plurality of sensors configured to feedback the current position and orientation of the optical sensor.

DETAILED DESCRIPTION OF THE PREFERRED EMBODIMENTS

As used herein and in the claims, "comprising" means including the following elements but not excluding others.

Figure 1:
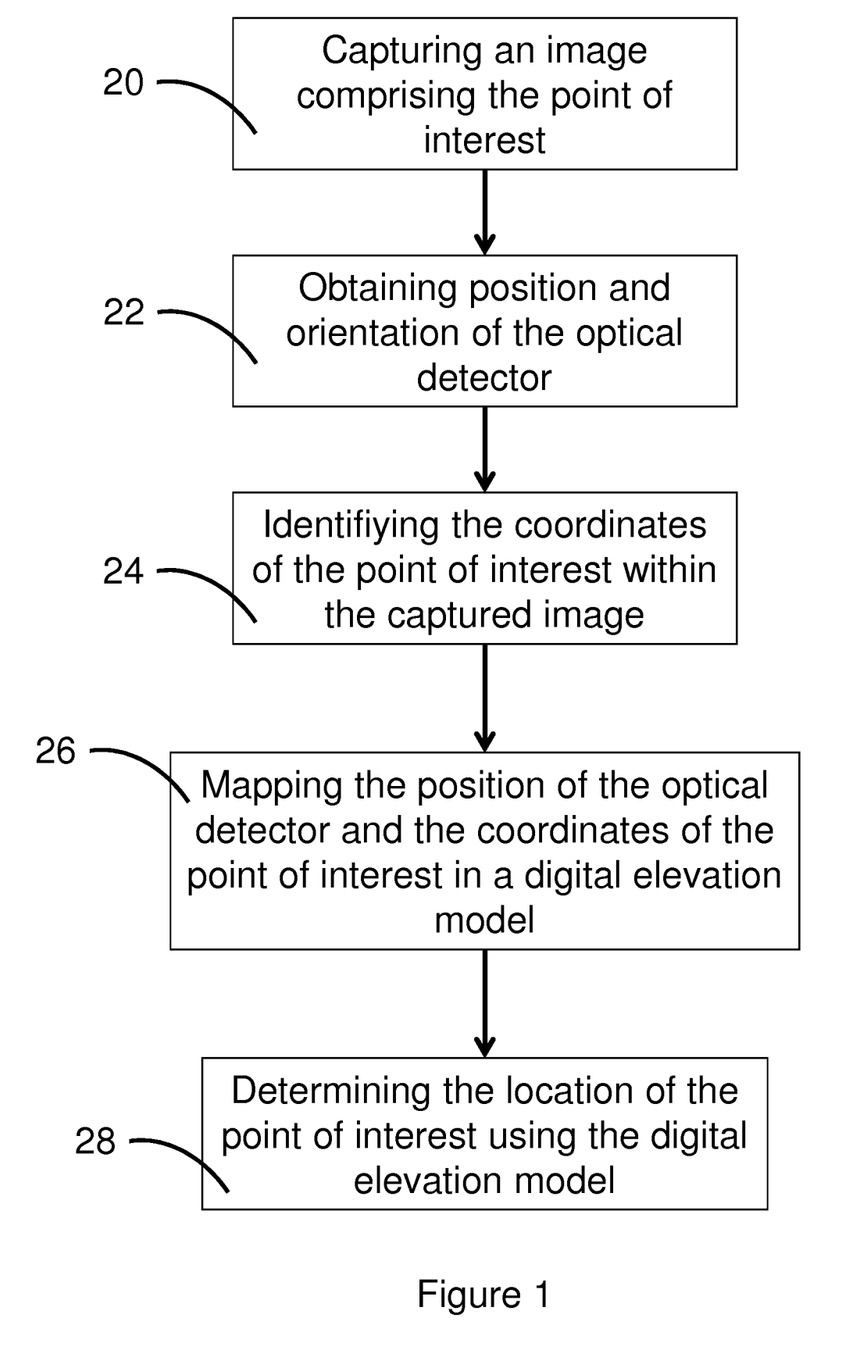
FIG. 1 is a flow chart of a method of determining the location of a point of interest according to one embodiment of the present invention.

Referring now to FIG. 1, the first aspect of the present invention is a method of determining the location of a point of interest. In step 20, an image comprising the point of interest is captured by an optical detector 30. Then, the position and orientation of the optical detector 30 at the time the image was taken are obtained in step 22. The point of interest is selected from the image and at least one coordinates of the point of interest in the image are identified in step 24. In one embodiment, the point can be represented by the 2-dimensional coordinates (i.e. x coordinate and y coordinate) as in a Cartesian coordinate system. In one specific embodiment, a particular point in the Cartesian coordinate system represents a pixel of the image. In another specific embodiment, a particular point in the Cartesian coordinate system represents a plurality of pixel of the image. Having a particular point representing a plurality of pixel of the image can reduce the computational demand of the method. In step 26, the position of the optical detector 30 and the coordinates of the point of interest as determined in step 24 are mapped in a digital elevation model (DEM). In one specific embodiment, the DEM represents the terrain of the Earth. The position of the optical detector 30 is obtained in a form of geographic coordinates, which includes the information of longitude, latitude and altitude. In one embodiment, the position of the optical detector 30 is obtained by a Global Positioning System. In another embodiment, global coordinates are manually inputted in order to provide the position of the optical detector 30. The coordinates of the point of interest are determined based on the relationship among the field of view, the position and the orientation of the optical detector 30 at the time of the optical detector 30 captured the image. In one embodiment, the orientation of the optical detector 30 is obtained by using an attitude and heading reference system. In one specific embodiment, the attitude and heading reference system comprises a gyroscope, an accelerometer and a digital compass. In yet another embodiment, the orientation of the optical detector 30 is obtained by detecting the degree to which a moveable platform (which can be human hand or provided as a form of mechanical moveable platform) is offset. In step 28, the location of the point of interest is determined using the DEM.

In one embodiment, the DEM is a substantially spherical point cloud which comprises a plurality of points. Each of the points represents the altitude of a terrain's surface at specific latitude and longitude. In another embodiment, any three adjacent points are linked together to from a plurality of triangular surface thereby providing a three dimensional model of the terrain's surface. In yet another embodiment, any four adjacent points are linked together to from a plurality of rectangular surface thereby providing a three dimensional model of the terrain's surface. In one embodiment, the posting interval of the DEM is 30 mm and the accuracy is 7-14 m (standard deviation).

Figure 2:
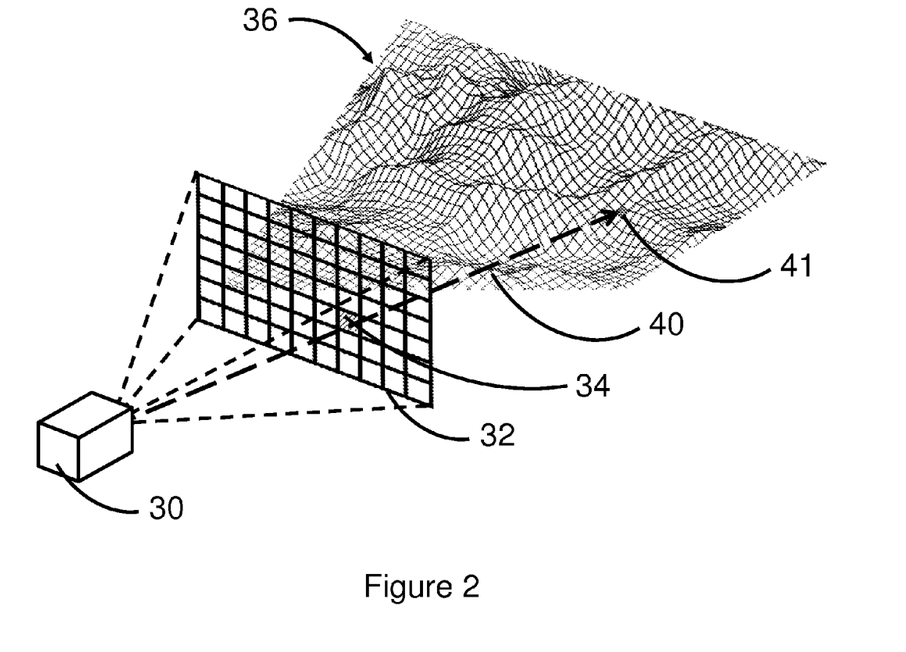
FIG. 2 shows a projection path in a digital elevation model illustrating the algorithm of determining the location of a point of interest according to one embodiment of the present invention.

The algorithm of determining the location of point of interest using the DEM in step 28 is illustrated in FIG. 2. As shown in FIG. 2, the optical detector 30, the captured image 32 and the coordinates 34 of the point of interest with respect to the captured image 32 are mapped in the DEM 36 according to their positions and orientations in the real world respectively. To determine the location of the point of interest, a path 40 passing through the optical detector 30 and the coordinates 34 was first projected. The path 40 illustrates the trajectory of light originated from the point of interest entering the optical detector 30. After the path 40 is projected, it will extend incrementally away from the optical detector 30 in the direction of the path 40 passing through the optical detector 30 and the coordinates 34. In one embodiment, the path 40 extends by one pixel along the direction of the path 40 in each increment. For each increment, a collision detection algorithm will be executed to determine if the path collides with any surface of the DEM. In one embodiment, the path keeps extending until 1) the path collides with a particular surface of the DEM; or 2) the length of the path has extended over a predetermined value. In one specific embodiment, the predetermined value is the effective detection range of the optical detector system. In a specific embodiment, the effective detection range is 5 km with an optical detector system with a 320×240 pixel sensor.

If collision between the path 40 and a particular surface of the DEM is detected, that collision surface 41 refers to the location of the point of interest. In one embodiment, the xyz-coordinates of the collision surface 41 with respect to the DEM 36 correlate to the latitude, longitude and altitude of the point of interest respectively. In one specific embodiment, the geographic coordination (i.e. the latitude, longitude and altitude) of the point of interest is obtained by checking a predefined database. In yet another specific embodiment, the latitude and longitude of that particular surface is provided as the latitude and longitude of the point of interest. In a further specific embodiment, the altitude of the point of interest, which is equivalent to the altitude of that particular surface, is also provided.

On the other hand, if no collision is detected even the path 40 is extended beyond a predetermined value, an error message will be provided. In one embodiment, the error message indicates that the point of interest is at or beyond the edge of the DEM.

Figure 3:
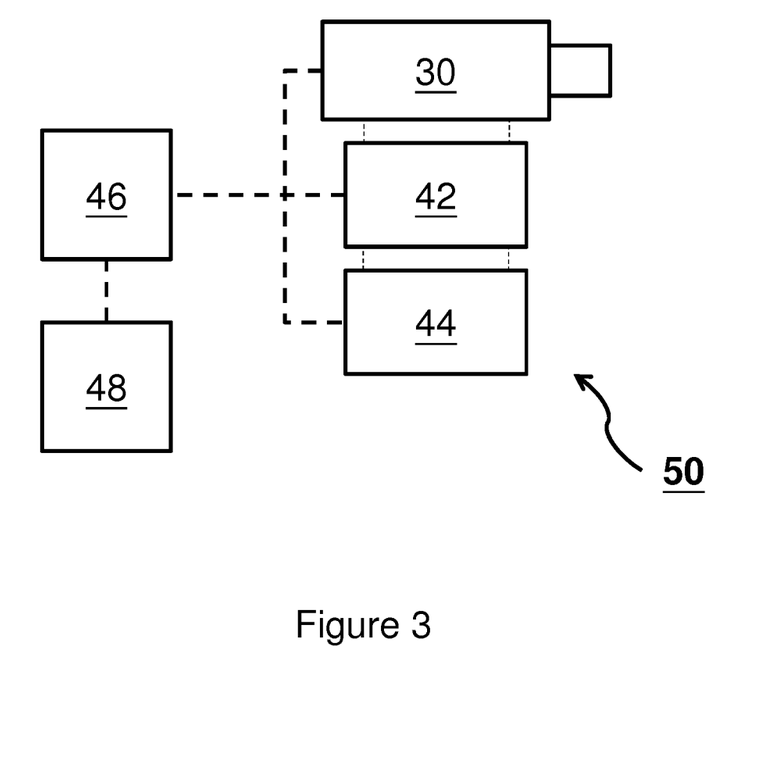
FIG. 3 is a schematic diagram of an apparatus according to one embodiment of the present invention.

The second aspect of the present invention, as shown in FIG. 3, is a system 50 for determining the location of a point of interest by applying the aforesaid method. The system 50 comprises an optical detector 30 for capturing images, a sensing device 49 which includes a locating system 42 for obtaining geographic coordinates of the optical detector 30 and an orientation system 44 for obtaining the orientation of the optical detector 30, a microprocessor 46 and a non-transitory computer-readable storage medium 48. The sensing device 49 is configured to detect the position and the orientation of the optical detector 30 and feedback the position and the orientation of the optical detector to the microprocessor 46. The microprocessor 46 is coupled to the optical detector 30, the locating system 42, the orientation system 44 and the non-transitory computer-readable storage medium 48. The non-transitory computer readable storage medium 48 is encoded with instructions that when performed by the microprocessor 36, causes performance of the steps of the aforesaid method.

In one embodiment, the locating system 42 is configured to receive a manual input of the global coordinates of the optical detector 30 from the user of the system 50. In another embodiment, the orientation system 44 detects the degrees to which a moveable platform (which can be human hand or provided as a form of mechanical moveable platform) is offset. In one specific embodiment, orientation system 44 is a mechanism configured to report the offset angles of the platform.

In one embodiment, the system 50 is an electronic device which includes a camera, a Global Positioning receiver (i.e. locating system 42), an attitude and heading reference system (AHRS) (i.e. orientation system 44), a micro-computer (i.e. microprocessor 46 and non-transitory computer-readable storage medium 48). In one specific embodiment, the attitude and heading reference system (AHRS) comprises a gyroscope, an accelerometer and a digital compass. In another specific embodiment, the electronic device is smartphone, tablet, laptop computer, binocular, camera and/or handheld video camcorder.

Figure 4:
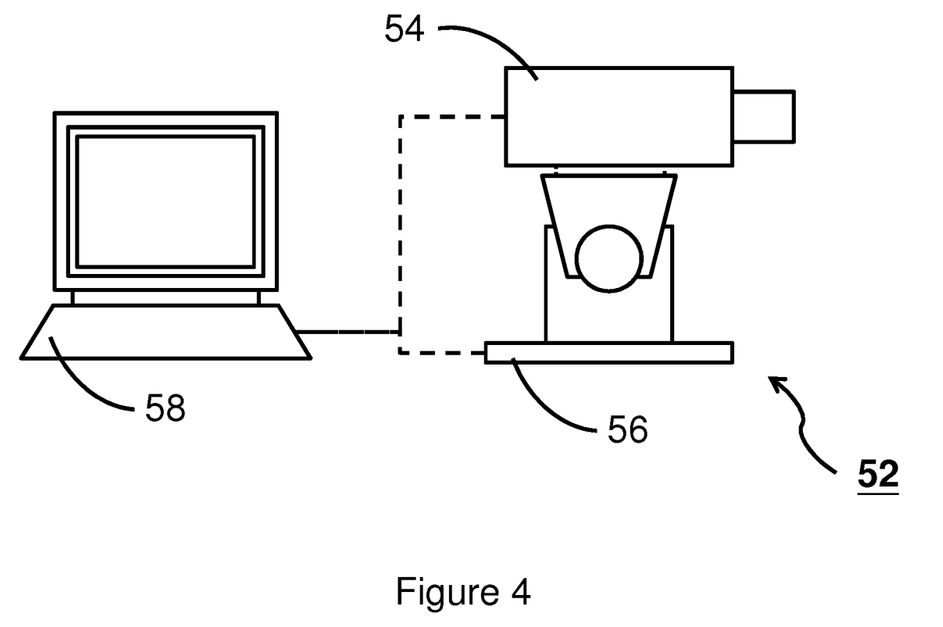
FIG. 4 is a schematic diagram of an apparatus for detecting wildfire according to another embodiment of the present invention.

To better illustrate the present invention, a specific realization of applying the aforesaid method and system on detecting wildfire is shown in FIG. 4. A system 52 for detecting wildfire comprising an optical detector 54 for capturing images, a movable platform 56 coupled to the optical detector 54 for rotating and tilting the optical detector 54 and a microcomputer 58 coupled to the optical detector 54 and the movable platform 56. In one embodiment, the microcomputer 58 further comprises a microprocessor (not shown) and a non-transitory computer-readable storage medium (not shown). In the context of detecting wildfire, the optical detector 54 is an infrared image sensor configured to capture heat distribution within a predefined range. In one embodiment, the infrared image sensor comprises a plurality of cooled photodetectors configured to detect far infrared emitted by the wildfire. In yet another embodiment, the infrared image sensor comprises a plurality of uncooled photodetectors configured to detect far infrared emitted by the wildfire. In one specific embodiment, the infrared image sensor can output 14-bit signals to the microcomputer 58 for further processing.

The infrared image senor is further coupled to a movable platform 56. In one embodiment, the movable platform 56 is a numerical control head with positioning accuracy of ±0.2°. In another embodiment, the movable platform 56 is configured to the continuously rotate and tilt upon receiving instruction from the microcomputer 58. In another embodiment, the optical detector 54 is configured to continuously rotate and tilt within a predetermined angle while capturing images of the environment. In one specific embodiment, the movable platform 56 is freely rotatable along its axial axis. In another specific embodiment, the tilt range of the movable platform 56 is ±40°. In another embodiment, the movable range of the movable platform 56 is adjustable according to the user's preferences without affecting the performance of the system 50.

Accordingly, the microcomputer 58 is coupled to the optical detector 54 and the movable platform 56. In the context of detecting wildfire, the microcomputer 58 is configured to analyze the heat distribution as captured by the infrared image sensor thereby determining the coordinates of the place which is on fire with respect to the image (i.e. selecting the point of interest from the captured image by identifying an object that emits infrared signal over predetermined value). In one embodiment, the microcomputer 58 is further configured to retrieve the position and orientation of the movable platform 56. After the coordinates of point of interest; and the position and orientation of the movable platform 56 are determined, the microcomputer 58 is then configured to execute the aforesaid method to determine the location of the place that is on fire.

To further facilitate the detection of wildfire, the system 52 further comprises a mist-fog-penetrating detector (not shown). The mist-fog-penetrating detector is essential for wildfire detection application. Due to the inherited limitation of infrared image sensor 54, objects emitting similar amount of infrared (i.e. with similar temperature) within a region could not be identified distinctively merely based on the heat distribution as capture by the infrared image sensor. For instance, if there is a burning tree surrounded by a pile of rocks with similar temperature, the system 52 may misinterpret the fire area and wrongly determine the coordinates of the point on fire. As such, mist-fog-penetrating detector which can provide clear grayscale image of the actual forest environment can greatly improve the efficiency and accuracy of the system 52 as proposed by the present invention.

In one embodiment, the mist-fog-penetrating detector comprises a fixed-focal lens, a high dynamic range image sensor and a first light filter coupled to the high dynamic range image sensor which is configured to filter out the visible spectrum before the light is captured by the image sensor. In the environment of wildfire, the visible spectrum of the environment light will diffract and scatter when it hits the surrounding water vapors or dust particles. The intensity of these diffracted/scattered lights is usually higher than that of the lights reflected by surrounding objects. The first light filter is configured to filter out these high intensity lights.

In another embodiment, the mist-fog-penetrating detector further comprises a second light filter which allows only the near infrared spectrum to reach the high dynamic range image sensor. The penetration power of near infrared spectrum is higher than that of visible light. Another characteristic of near infrared spectrum is that: dark-color-objects absorb more near infrared spectrum than light-color-objects. Therefore by analyzing the intensity of the near infrared spectrum as captured by the high dynamic range image sensor of the mist-fog-penetrating detector, different objects can be identified based on their color. In one embodiment, the grayscale image captured by the mist-fog-penetrating detector is compared with the heat distribution captured by the infrared image sensor to reduce the false alarm of the wildfire detection system.

The exemplary embodiments of the present invention are thus fully described. Although the description referred to particular embodiments and realizations, it will be clear to one skilled in the art that the present invention may be practiced with variation of these specific details. Hence this invention should not be construed as limited to the embodiments set forth herein.

For example, wildfire detection system and method is disclosed as one of the realization of the present invention. The method and system as taught by the present invention should be able to be applied to other applications, for instance security monitoring system and line of sight analysis.

The optical detector 30 is selected from a group consisting of infrared image sensor, mist-fog-penetrating detector and combination thereof according to the embodiments described above. However, the optical detector 30 can be other detectors according to the requirement of a particular application, for instance complementary metal-oxide-semiconductor (CMOS) image sensor, charge-coupled device (CCD) sensor and Ultraviolet (UV) image sensor.

What is claimed is:

1. A method of determining a location of a point of interest comprising:
providing an optical detector;
capturing an image by said optical detector;
obtaining a position and an orientation of said optical detector;

assessing a degree to which an attitude and heading reference system is offset;
identifying at least one coordinates of said point of interest within said image;
mapping said position of said optical detector and said coordinates of said point of interest in a digital elevation model; and
determining said location of said point of interest by projecting at least one path from said position of said optical detector through said coordinates of said point of interest in said digital elevation model.

2. The method of claim 1, wherein said step of determining said location of said point of interest further comprises iterative steps of:
extending said path in the direction away from said optical detector; and
determining whether said path collides with any surface of said digital elevation model;
wherein said iterative steps terminate when at least one of termination conditions is satisfied, said termination conditions including:
a collision surface is identified between said path and said digital elevation model; and
said path has extended over a predetermined value.

3. The method of claim 2, wherein said determining said location of said point of interest further includes calculating and obtaining said location in a form of geographic coordination based on said collision surface.

4. The method of claim 1 further comprising continuously rotating and tilting said optical detector within a predetermined angle while capturing said image.

5. The method of claim 1, wherein said obtaining said position of said optical detector further includes gathering a geographic coordination of said optical detector through a Global Positioning System.

6. The method of claim 1 further comprising selecting said point of interest from said captured image by identifying an object on said captured image.

7. The method of claim 6, wherein said object emits an infrared signal over a predetermined value.

8. The method of claim 1 further comprising selecting said point of interest by a user input.

9. The method of claim 1 further comprising generating said digital elevation model by:
providing a point cloud comprising a plurality of points; and
linking said plurality of points thereby generating a three dimensional model of a terrain's surface;
wherein each of said points correlates to the altitude of said terrain's surface at a specific latitude and longitude.

10. A system for determining a location of a point of interest comprising:
an optical detector that captures an image including said point of interest;
a movable platform coupled to said optical detector and rotates and tilts said optical detector;
a microprocessor coupled to said optical detector and said movable platform; and
a non-transitory computer-readable storage medium coupled to said microprocessor, said non-transitory computer-readable storage medium encoded with computer-readable instructions that cause said microprocessor to execute:
capturing said image;
obtaining a position and an orientation of said optical detector;
identifying at least one two-dimensional Cartesian coordinates of said point of interest within said image;
mapping said position of said optical detector and said coordinates of said point of interest in a digital elevation model; and
determining said location of said point of interest by projecting at least one path from said position of said optical detector through said coordinates of said point of interest in said digital elevation model,
wherein said optical detector is an infrared image sensor that captures a heat distribution or light intensity within a range of said optical detector; said non-transitory computer-readable storage medium is further encoded with computer-readable instructions that cause said microprocessor to determine said coordinates of said point of interest based on said heat distribution.

11. The system of claim 10 further comprising a mist-fog-penetrating detector, wherein said mist-fog-penetrating detector comprises:
a high dynamic range image sensor; and
a first light filter unit coupled to said high dynamic range image sensor;
said first light filter unit filters out visible spectrum from light reaching said high dynamic range image sensor.

12. The system of claim 11 further comprising a second light filter unit coupled to said first light filter unit; said second light filter allows only near infrared spectrum to reach said high dynamic range image sensor.

13. The system of claim 10 further comprising a sensing device coupled to said microprocessor; said sensing device detects said position and said orientation of said optical detector and sends said position and said orientation of said optical detector to said microprocessor.

14. They system of claim 13, wherein said sensing device comprises a Global Positioning System receiver that detects said position of said optical detector and attitude and a heading reference system (AHRS) that detects said orientation of said optical detector.

15. A non-transitory computer readable storage medium encoded with instructions that, when executed by one or more processors, causes:
capturing an image by an optical detector;
obtaining a position and an orientation of said optical detector;
identifying at least one coordinates of said point of interest within said image;
mapping said position of said optical detector and said coordinates of said point of interest in a digital elevation model; and
determining said location of said point of interest by:
projecting at least one path from said position of said optical detector through said coordinates of said point of interest in said digital elevation model; and
calculating and obtaining said location in a form of geographic coordination.

16. The non-transitory computer readable storage medium of claim 15, wherein said determining said location of said point of interest further comprises iterative steps of:
extending said path in the direction away from said optical detector; and
determining whether said path collides with any surface of said digital elevation model;
wherein said iterative steps terminate when at least one of termination conditions is satisfied, said termination conditions including:
a collision surface is identified between said path and said digital elevation model; and
said path has extended over a predetermined value.

17. The non-transitory computer readable storage medium of claim 15, wherein said instructions further including continuously rotating and tilting said optical detector within a predetermined angle while capturing said image.

* * * * *